(12) United States Patent
Kelly et al.

(10) Patent No.: US 9,440,659 B2
(45) Date of Patent: Sep. 13, 2016

(54) DRIVER ADVICE SYSTEM FOR A VEHICLE

(75) Inventors: James Kelly, Solihull (GB); Andrew Fairgrieve, Rugby (GB); Dan Dennehy, Coventry (GB); Elliot Hemes, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/378,429

(22) PCT Filed: Sep. 6, 2012

(86) PCT No.: PCT/EP2012/067458
§ 371 (c)(1),
(2), (4) Date: Oct. 20, 2014

(87) PCT Pub. No.: WO2013/120546
PCT Pub. Date: Aug. 22, 2013

(65) Prior Publication Data
US 2015/0057883 A1    Feb. 26, 2015

(30) Foreign Application Priority Data
Feb. 13, 2012    (GB) .................................. 1202427.9

(51) Int. Cl.
*G06F 7/00* (2006.01)
*B60W 50/08* (2012.01)
(Continued)

(52) U.S. Cl.
CPC ............ *B60W 50/082* (2013.01); *B60W 10/00* (2013.01); *B60W 10/12* (2013.01); *B60W 10/14* (2013.01); *B60W 10/22* (2013.01); *B60W 30/18* (2013.01); *B60W 50/085* (2013.01); *B60W 50/14* (2013.01); *G05B 19/042* (2013.01); *H04L 67/12* (2013.01);
(Continued)

(58) Field of Classification Search
CPC ..... B60W 10/00; B60W 10/12; B60W 10/22
USPC .......................... 701/36, 24, 37, 41, 53, 117
See application file for complete search history.

(56) References Cited

U.S. PATENT DOCUMENTS 4,204,255 A    5/1980  Cremer
8,352,120 B2 *  1/2013  Craig et al. ..................... 701/36
(Continued)

FOREIGN PATENT DOCUMENTS

DE    2939115 A       4/1980
EP    1355209 A1 *   10/2003
(Continued)

OTHER PUBLICATIONS

Search Report corresponding to application No. 1215956.2, dated May 24, 2013, 8 pages.
(Continued)

*Primary Examiner* — Thomas G Black
*Assistant Examiner* — Luke Huynh
(74) *Attorney, Agent, or Firm* — Reising Ethington P.C.

(57) ABSTRACT

A driver advice system for a vehicle having at least one vehicle subsystem comprises a selector for receiving at least one driving condition indicator for the vehicle and for selecting, from a plurality of settings, a preferred setting for the at least one vehicle subsystem in response to the at least one driving condition indicator. The driver advice system includes an indication device for providing to the driver an indication of the preferred setting for one or more of the vehicle subsystems.

25 Claims, 2 Drawing Sheets

(51) Int. Cl.
*G05B 19/042* (2006.01)
*B60W 50/14* (2012.01)
*B60W 10/14* (2012.01)
*B60W 10/22* (2006.01)
*B60W 30/18* (2012.01)
*B60W 10/00* (2006.01)
*B60W 10/12* (2012.01)
*H04L 29/08* (2006.01)

(52) U.S. Cl.
CPC .... *B60W 2050/146* (2013.01); *B60W 2520/10* (2013.01); *B60W 2540/30* (2013.01); *B60W 2550/141* (2013.01); *B60W 2550/143* (2013.01)

(56) References Cited

U.S. PATENT DOCUMENTS

| | | | |
|---|---|---|---|
| 8,589,049 | B2 * | 11/2013 | Craig ............................ 701/80 |
| 2003/0200016 | A1 | 10/2003 | Spillane et al. |
| 2009/0069953 | A1 | 3/2009 | Hale et al. |
| 2009/0164071 | A1 | 6/2009 | Takeda |

FOREIGN PATENT DOCUMENTS

| | | |
|---|---|---|
| GB | 2357159 A | 6/2001 |
| GB | 2403027 A | 7/2004 |
| GB | 2492748 A | 4/2011 |
| JP | H08169222 A | 7/1996 |
| JP | 2006076373 A | 3/2006 |
| JP | 2008006995 A | 1/2008 |
| JP | 2009067246 A | 4/2009 |
| JP | 2009126245 A | 6/2009 |
| JP | 2009149243 A | 7/2009 |
| WO | WO2009/066143 A | 5/2009 |

OTHER PUBLICATIONS

English summary of Japanese office action corresponding to application No. JP 2014-530157, dated May 12, 2015, 2 pages.
International Search Report for PCT/EP2012/067458, dated Feb. 26, 2013, 7 pages.
UK Search Report for GB1202427.9, dated Jun. 8, 2012, 7 pages.
Japanese Office action with English summary corresponding to JP application No. 2014-530157, dated Oct. 13, 2015, 4 pages.
Japanese Decision of Refusal, with English summary, corresponding to JP application No. 2014-530157, dated Mar. 1, 2016, 3 pages.

* cited by examiner

DRIVER ADVICE SYSTEM FOR A VEHICLE

FIELD OF INVENTION

The present invention relates to a driver advice system for a vehicle and to a method of advising a driver on vehicle operation. Aspects of the invention relate to a system, to a method and to a vehicle.

BACKGROUND TO THE INVENTION

It is known in vehicles to provide various different subsystems which can operate in different configurations so as to suit different driving conditions. By way of example, automatic transmissions can be controlled in a variety of modes (e.g. sport, manual, winter or economy) in which changes between gear ratios and other subsystem control parameters are modified so as to suit the conditions of the terrain or driving style of the driver. It is also known to provide air suspensions with on-road and off-road modes. Stability control systems can be operated at reduced activity so as to give the driver more direct control, and power steering systems can be operated in different modes to provide a varying level of assistance depending on driving conditions.

The Applicant has recognised previously that the high level of choice for drivers poses a complicated and confusing scenario for an effective, safe and enjoyable driving experience. Our granted U.S. Pat. No. 7,349,776 describes a vehicle control system in which the driver can implement improved control over a broad range of driving conditions, and in particular over a number of different terrains which may be encountered when driving off-road. In response to a driver input command relating to the terrain, the vehicle control system is selected to operate in one of a number of different driving modes. For each driving mode, the various vehicle subsystems are operated in a manner appropriate to the corresponding terrain.

It has now been recognised that further improvements to the vehicle control system would provide a more effective and enjoyable driving experience for a range of driving styles and driver abilities. It is therefore an object of the present invention to provide an improvement to systems generally of the aforementioned type. Other aims and advantages of the invention will become apparent from the following description, claims and drawings.

By way of background to the present invention, WO2009/066143 describes a presentation device for a vehicle in which a recommended control state for a driver-selected mode of travel is compared with a recommended control state for the actual mode of travel. If there is a deviation between the recommended control state and the actual control state, the driver is presented with a recommendation to change the control state. The method therefore involves a comparison between a control state appropriate for a driver-defined mode of travel and an actual control state in generating advice for the driver.

SUMMARY OF THE INVENTION

Aspects of the invention provide a system, a method and a vehicle as claimed in the appended claims.

According to another aspect of the invention, there is provided a driver advice system for a vehicle having at least one vehicle subsystem; the driver advice system comprising selection means for receiving at least one driving condition indicator for the vehicle and for selecting, from a plurality of settings, a preferred setting for the at least one vehicle subsystem. The preferred setting may be selected in response to the at least one driving condition indicator. The driver advice system may further include an indication means for providing to the driver an indication of the preferred setting for at least one of the vehicle subsystems. In response to receiving the indication of the preferred setting, the driver can then act on the advice to select the preferred setting for the at least one vehicle subsystem.

In one embodiment, therefore, the driver advice system further includes means for receiving, from the driver acting in response to the indication, an input indicative of the preferred setting.

The system may further include control means responsive to the driver-input and being arranged to select the preferred setting for the at least one vehicle subsystem.

The driver may be advised on the most appropriate setting for any one of the vehicle subsystems, for example a transfer box system, a braking system, a steering system or an accelerator system, or may be advised on two or more of the vehicle subsystems, depending on the required level of sophistication of the vehicle.

Embodiments of the invention therefore provide a driver advice system that is operable in response to one or more driving condition indicators to provide advisory instruction to the driver regarding at least one vehicle setting. The at least one vehicle setting may include, for example, a transfer box status and/or a ride height status. On receipt of the advice, the driver can then act to select the vehicle setting that has been determined to be the most appropriate for the particular driving conditions.

The system may further comprise means for generating a signal from which the at least one driving condition indicators is derived. For example, the means for generating may include one or more of a vehicle detection system and a vehicle sensor system.

At least one of the driving condition indicators may be derived from a signal indicative of the terrain in the immediate vicinity of the vehicle over which it is travelling (e.g. the terrain immediately beneath the vehicle wheels). Alternatively, at least one of the driving condition indicators may be derived from a signal indicative of the terrain in the surrounding vicinity of the vehicle over which it is about to travel. In another embodiment, at least one of the driving condition indicators is derived from a signal indicative of a style of driving of the vehicle (e.g. sport mode, economy mode).

For example, said means for generating may include one or more of a vehicle detection system and a vehicle sensor system. The vehicle detection system may include one or more of a camera system, a RADAR system and a LIDAR system. The vehicle sensor system may include one or more of a wheel speed sensor, a temperature sensor, a pressure sensor, a gyroscopic sensor for measuring yaw, roll or pitch of the vehicle, a vehicle speed sensor an engine torque sensor, a longitudinal acceleration sensor, a steering angle sensor, a steering wheel speed sensor, a gradient sensor, a lateral acceleration sensor, a brake pedal position sensor, an acceleration pedal position sensor and longitudinal, lateral and/or vertical motion sensors.

Importantly, in some embodiments of the invention, the driving condition indicators are derived from a system or systems provided on the vehicle. This differs from the aforementioned prior art system in which a user-defined input is used as the basis for the comparison on which advice to the driver is provided.

In other embodiments of the invention, the driving condition indicators may correspond to the status of a control system of the vehicle, which may be a status selected by the user of the vehicle.

The driving condition indicators may include one or more of vehicle speed, road roughness, distance traveled with road roughness, surface friction at the vehicle wheels, vehicle gradient or attitude, engine torque of the vehicle engine and ambient temperature.

By way of example, one of the vehicle subsystems may be a transfer box and wherein settings for the transfer box from which the preferred setting is selected include high and low range settings. In another example the vehicle subsystem may be a driving style mode selector which enables selection between, for example, sport mode, standard mode or economy mode. The settings for the driving style mode selector from which the preferred setting is selected may therefore include at least one or more of sport mode, economy more and standard mode.

The driver advice system may further include means for receiving a signal indicative of vehicle speed; means for comparing the signal indicative of vehicle speed with a predetermined threshold vehicle speed above which the low range setting is inappropriate; and means for inhibiting the indication means in circumstances in which the preferred setting is determined to be the low range setting and the vehicle speed exceeds the predetermined threshold vehicle speed.

In another example, one of the vehicle subsystems may be an air suspension system and wherein settings for the air suspension system from which the preferred setting is selected include off-road, intermediate and on-road ride height settings. The driver advice system may further include means for receiving a signal indicative of vehicle speed; means for comparing the signal indicative of vehicle speed with a predetermined threshold vehicle speed above which the off-road ride height setting is inappropriate; and means for inhibiting the indication means in circumstances in which the preferred setting is determined to be the off-road ride-height setting and the vehicle speed exceeds the predetermined threshold vehicle speed.

In an embodiment, the selection means also receives a trailer-attached status signal, and wherein the preferred setting for the or each of the vehicle subsystems is also determined in response to the trailer-attached status signal.

The indication means may include a visual display device (device (e.g. LCD screen or head up display) and/or an audio device and/or a kinesthetic device, by which means information relating to the preferred setting is relayed to the driver of the vehicle.

According to a further aspect of the invention, there is provided a vehicle control system for at least one vehicle subsystem of a vehicle, the vehicle control system comprising the driver advice system in accordance with a preceding aspect of the invention. The vehicle control system may further include a subsystem controller for controlling at least one vehicle subsystem in a plurality of subsystem control modes, each of which corresponds to one or more different driving conditions for the vehicle, and evaluation means for evaluating at least one of the driving condition indicators to determine the extent to which each of the subsystem control modes is appropriate and for providing an output indicative of the subsystem control mode that is most appropriate.

The vehicle control system may further comprise an automatic control means operable in an automatic response mode to select a subsystem control mode in dependence on the output.

The evaluation means may preferably take the form of a software-implemented evaluation means in the form of a processor located within a vehicle control unit of the vehicle control system.

In one embodiment, the evaluation means is arranged to determine the probability that each of the subsystem control modes is appropriate and wherein the output provided by the evaluation means is indicative of the subsystem control mode with the highest probability.

The or each vehicle subsystem that the driver is advised upon by the driver advice system may, but need not, be the same as the or each of the vehicle subsystems which is selected in the automatic response mode.

Each of the driving conditions to which each of the subsystem control modes corresponds is representative of at least one terrain type, or of a style of driving of the vehicle (e.g. sport mode, economy mode).

In an embodiment of this aspect of the invention, the driver advice system is further operable in response to the output indicative of the subsystem control mode that is most appropriate e.g. with the highest probability of being appropriate.

The vehicle control system may further include switching means for enabling switching between the automatic response mode in which the automatic control means controls the vehicle subsystems in dependence on the output automatically, and a manual response mode in which the appropriate subsystem control mode is selected by the driver manually.

The driver advice system may be further operable to provide an indication to the driver to switch to the automatic response mode if a subsystem control mode has been selected by the driver in the manual response mode which is inconsistent with the subsystem control mode selected in dependence on the output.

The at least one vehicle subsystem may include one or more of: an engine management system, a steering controller, a brakes controller, transmission controller and a suspension controller.

According to a still further aspect of the invention, there is provided a method for advising a driver of a vehicle comprising one or more vehicle subsystems, the method comprising: receiving at least one driving condition indicator for the vehicle; selecting, from a plurality of settings, a preferred setting for one or more of the vehicle subsystems in response to the at least one driving condition indicator; and providing to the driver an indication of the preferred setting for one or more of the vehicle subsystems.

According to yet another aspect of the invention, there is provided a vehicle having a driver advice system of a preceding aspect of the invention.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION OF THE INVENTION

Figure 1:
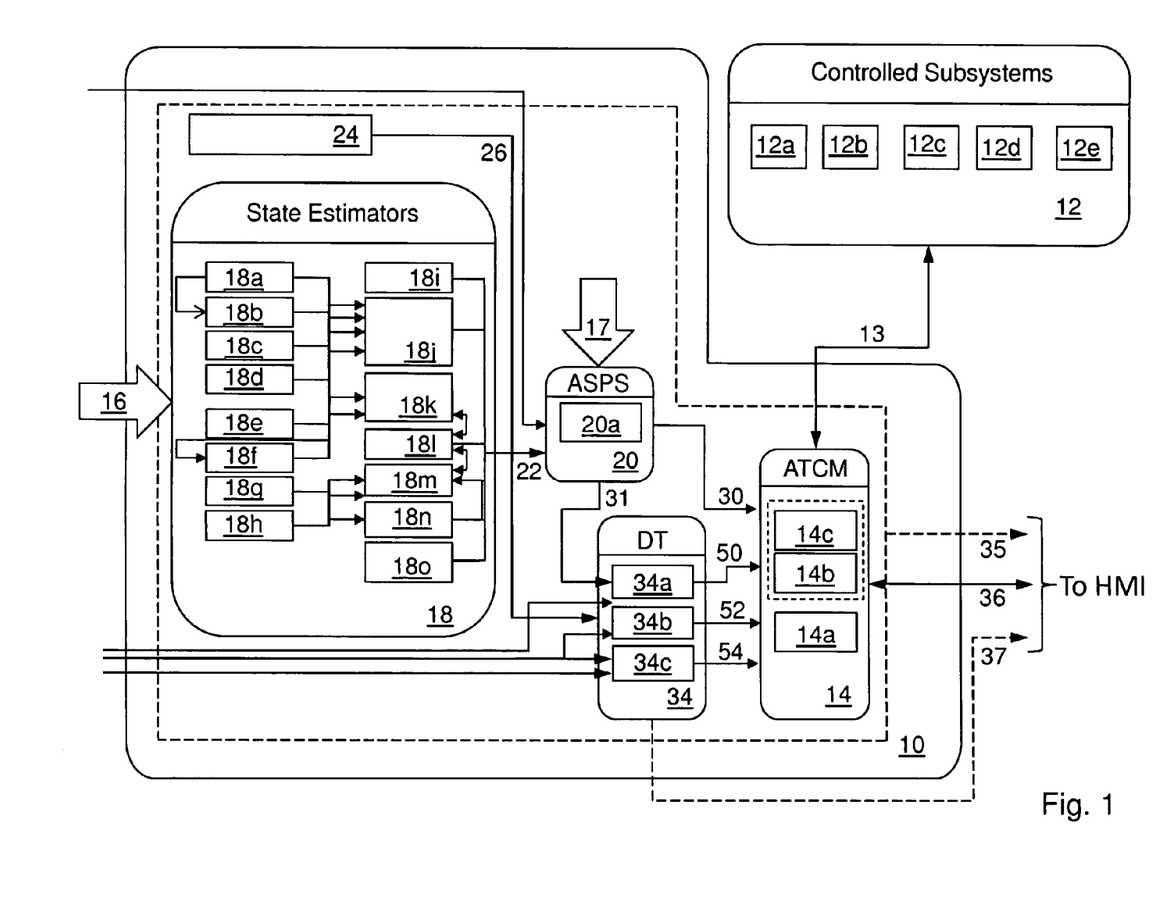
FIG. 1 is a block diagram to illustrate a vehicle control system including various vehicle subsystems under the control of the vehicle control system.
Figure 2:
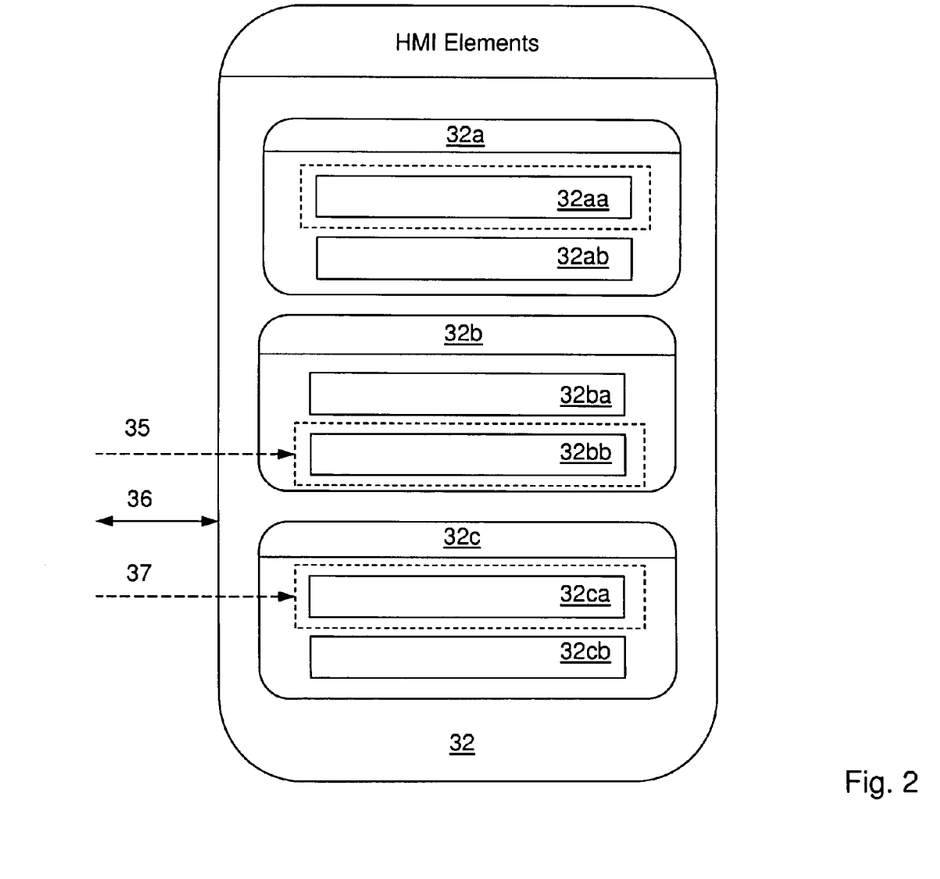
FIG. 2 is a block diagram of human machine interface (HMI) elements forming part of the vehicle control system in FIG. 1 in more detail.

FIGS. 1 and 2 show a vehicle control unit (VCU) 10 for a vehicle intended to be suitable for off-road use, that is for use on terrain other than regular tarmac road surfaces. The VCU 10 controls a plurality of vehicle subsystems 12 including, but not limited to, an engine management system 12a, a transmission system 12b, a steering system 12c, a brakes system 12d and a suspension system 12e. Although five subsystems are illustrated as being under the control of the VCU 10, in practice a greater number of vehicle subsystems may be included on the vehicle and may be under the control of the VCU 10. The VCU 10 includes a subsystem control module 14 (ATCM), which provides control signals via line 13 to each of the vehicle subsystems to control the subsystems in a manner appropriate to the driving condition, such as the terrain, on which the vehicle is travelling (referred to as the terrain condition). The subsystems 12 also communicate with the subsystems control module 14 via signal line 13 to feedback information on subsystem status.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of the invention is that the VCU 10 determines the most appropriate control mode for the various subsystems on the basis of the terrain indicators, and automatically controls the subsystems accordingly.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, sensors, such as gyroscopic sensors, for measuring yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor on the stability control system (SCS), a brake pedal position sensor, an acceleration pedal position sensor and longitudinal, lateral, vertical motion sensors.

In other embodiments, only a selection of the aforementioned sensors may be used.

The VCU 10 also receives a signal from the electronic power assisted steering unit (ePAS unit) of the vehicle to indicate the steering force that is applied to the wheels (steering force applied by the driver combined with steering force applied by the ePAS system).

The vehicle is also provided with a plurality of sensors which provide discrete sensor outputs 17 to the VCU 10, including a cruise control status signal (ON/OFF), a transfer box status signal (whether the gear ratio is set to a HIGH range or a LOW range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), air suspension status (Raised/High, Normal, or Low), and a Dynamic Stability Control (DSC) signal (ON/OFF).

The vehicle may also be provided with one or more detection systems (not shown in the accompanying figures) in the form of a camera system, a RADAR system or a LIDAR system. The camera system may, for example, include one or more camera sensors that form a part of a parking aid system on the vehicle. Alternatively, the cameras may be provided to give an indication of the nature of the terrain in the surrounding vicinity of the vehicle, but not necessarily the terrain immediately beneath the vehicle wheels. Further examples of the use of camera data in the present invention will be described in further detail below.

The VCU 10 includes an evaluation means in the form of an estimator module 18 and a calculation and selection means in the form of a selector module 20. Initially the continuous outputs 16 from the sensors are provided to the estimator module 18 whereas the discrete signals 17 are provided to the selector module 20.

The estimator module 18 comprises a plurality of estimator modules dedicated to specific aspects of vehicle and vehicle sub-system behaviour. In the example shown, these modules comprise: wheel acceleration 18a; wheel inertia torque estimator 18b; vehicle longitudinal force 18c; aerodynamic drag estimator 18d; wheel longitudinal force estimator 18e; wheel slip detection 18f; lateral acceleration estimator 18g; vehicle yaw estimator 18h; wheel speed variation and corrugation detection 18i; surface rolling resistance 18j; wheel longitudinal slip or 'breakaway torque' 18k; surface friction or 'mu' plausibility check 18l; lateral surface friction or 'mu' estimation/rut detection 18m; steering force estimator 18n; and corrugation detection estimation 18o.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating mass of the wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from a Stability Control Systems (SCS) ECU (not shown), which contains the DSC (Dynamic Stability Control) function, the TC (Traction Control) function, ABS (anti-lock braking system) and HDC (hill descent control) algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness/corrugation based on the air suspension sensors (the ride height sensors) and the wheel accelerometers. A terrain indicator signal in the form of a roughness output signal 26 is output from the road roughness module 24. Additionally or alternatively, wheel articulation data may be provided to the road roughness module 24 by appropriate sensing means, such as suspension stroke transducers, such as continuously variable damping (CVD) sensors.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes is most appropriate based on the indicators of the type of terrain in which the vehicle is travelling. The selector module 20 serves as an automatic special program selector (ASPS) and comprises an automatic special program selector (ASPS) algorithm, or probability algorithm 20a. The most appropriate control mode is determined by analysing the probability that each of the different control modes is appropriate on the basis of the terrain indicator signals 22, 26 from the estimator module 18 and the road roughness module 24.

The vehicle subsystems 12 may be controlled automatically (referred to as the "automatic mode") in response to a control output signal 30 from the selector module 20 and without the need for driver input. Alternatively, the vehicle subsystems 12 may be operated in response to a manual driver input (referred to as "manual mode") via a Human Machine Interface (HMI) module (not shown in FIG. 1).

When operating in the automatic mode, the selection of the most appropriate subsystem control mode is achieved by means of a three phase process:
(1) for each type of control mode, a calculation is performed of the probability that the control mode is suitable for the terrain over which the vehicle is travelling, based on the terrain indicators;
(2) the integration of "positive differences" between the probability for the current control mode and the other control modes; and
(3) the program request to the control module 14 when the integration value exceeds a predetermined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box status signal (whether the gear ratio is set to a HIGH range or a LOW range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 20.

The probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and/or rutted terrain, a rock crawl/boulder mode (RB mode) which is suitable for when the vehicle is travelling across rocky terrain such as a boulder field, a sand mode (Sand mode) which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways.

The different terrain types are grouped according to the friction of the terrain and the roughness of the terrain. For example, it is appropriate to group grass, gravel and snow together as terrains that provide a low friction and a relatively smooth surface, and it is appropriate to group rock and boulder terrains together as they tend to be characterised by relatively high friction and very high roughness.

For each subsystem control mode, the algorithm 20a within the selector module 20 performs a probability calculation, based on the terrain indicators, to determine a probability that each of the different control modes is appropriate. The selector module 20 includes a tunable data map which relates the continuous terrain indicators 22, 26 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 17, 22, 26. In the following equation, for each control mode the individual probability as determined for each terrain indicator is represented by a, b, c, d . . . n. The combined probability value, Pb, for each control mode is then calculated as follows:

$$Pb=(a.b.c.d \ldots n)/((a.b.c.d \ldots n)+(1-a).(1-b).(1-c).(1-d) \ldots (1-n))$$

Any number of individual probabilities may be input to the probability algorithm 20a and any one probability value input to the probability algorithm may itself be the output of a combinational probability function.

Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a driver advice system in the form of a driver tutoring (DT) or driver advice module 34, to initiate driver tutoring routines, as described in further detail below. The driver advice module 34 is fed with data from multiple vehicle sus-systems pertaining to the status and behaviour of the vehicle and comprises a plurality of elements dedicated to key features for example: auto response 34a; suspension ride height and/or pressure settings 34b; and transfer box ration setting 34c.

In phase (2), an integration process is implemented continually within the selector module (20) to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

If a high speed of response is required, one consequence may be that a high and frequent number of control mode changes are implemented. In some circumstances, the high number of changes may be inappropriate or excessive. The rate of change of the control mode is affected by two elements of the calibration process: the combined probability values of each of the control modes and the integrated positive difference threshold for change (the change threshold). The problem of frequent control mode changes can be countered in one of two ways. If the change threshold is set to a relatively large value, it will take longer for any one control mode to switch to another. This strategy will have an affect on all control mode selections. Alternatively, by ensuring there is only a small difference between the data map probability values for the different control modes, for example by setting all values to be close to 0.5, it will take longer for a change in the control mode to be implemented compared with the situation where there is a large difference. If desired, this strategy can be used to affect the speed of response in relation to only selected ones of the terrain indicators and control modes.

The probability difference between the current control mode and all other control modes is monitored continually and the integrated value for each control mode is continually compared with the predetermined change threshold. The predetermined change threshold is calibrated offline, prior to vehicle running, and is stored in a memory of the selector module 20.

It is beneficial for the predetermined change threshold to be variable with the terrain indicator for surface roughness. In this way the frequency with which the subsystem control mode is changed can be altered, depending on the nature of the terrain roughness in which the vehicle is travelling. For example, if the vehicle is travelling on-road (e.g. on a regular smooth road surface), where the surface roughness is low, the change threshold is set to a relatively high value so that it takes longer for the integrated difference value to reach the threshold and so the control mode is changed less frequently. This avoids a control mode change if, for example, a vehicle mounts a curb for a short period of time on an otherwise straightforward journey on a regular road. Conversely, if the vehicle is travelling off-road, where the surface roughness is high, the change threshold is set to a lower value so that the control mode is changed more frequently to accommodate the genuine changes in terrain that warrant an adjustment to the control mode.

In a preferred embodiment, one or more additional change thresholds may also be implemented for comparison with the integrated difference value, each of which is based on a different one of the terrain indicators. For example, another change threshold may be set dependent on vehicle rolling resistance. In this case the integrated difference value is compared with both thresholds (one for surface roughness and one for rolling resistance), and when a first one of the thresholds is crossed a change to the control mode is initiated.

If it is determined that the combined probability of the current control mode becomes zero, a control output signal 30 from the selector module 20 is sent to the control module 14 to implement one of the other control modes corresponding to that with the highest combined probability. Primarily, this mode of change will be implemented to handle discrete terrain indicators which are indicative that it is no longer acceptable to remain in the current control mode. For example, if the driver selects cruise control, the subsystem control module will automatically set the probability for the MR mode and sand mode to zero. This is because the GGS mode and the SP OFF mode are the only suitable modes for the vehicle subsystems if the vehicle is in a cruise control mode. If the RB mode is selected at the time the driver selects cruise control, the probability for the RB mode is immediately set to zero and the subsystem controller immediately selects one of the other control modes with the highest probability.

Other indicators that may be used to apply constraints to the number of control modes that are "available" for selection include DSC ON/OF status (e.g. if the DSC status is turned OFF, the automatic mode of operation is not available), trailer status and transfer box status (HIGH/LOW range).

There are a number of circumstances in which the integration process will be paused and the current integration value is stored in memory, rather than resetting to zero, as follows: (a) when the vehicle is travelling in reverse; (b) for a predetermined distance travelling forwards after a reverse motion; (c) when the vehicle is in park mode; (d) when the vehicle is travelling below a certain speed; (e) when the vehicle is changing gear; (f) when the vehicle is braking with zero throttle being applied; and (g) when active braking is taking place. For example, for option (b) above, the selector module 20 may be programmed so that, if it is determined that the RB mode has the highest combined probability value, the integration process is started as soon as the vehicle starts to move forwards after a reverse motion, rather than waiting for a predetermined distance.

The subsystem control module 14 will now be described in further detail. The module 14 includes three functions; a validation, fault management and check function 14a, an algorithm 14b to allow switching between automatic operation and manual operation (as described in further detail below), and an interface algorithm 14c for the (HMI) module to support the automatic response mode of operation. The HMI module 32 is shown in more detail in FIG. 2.

The subsystem control module 14 provides three output signals to the HMI module 32. A first output signal 35 provides a notification to the HMI module 32 of whether the automatic mode or the manual mode is active. If the automatic mode is active then a second output signal 36 is provided to notify the driver when the system is "optimising" and a change in the control mode is taking place. A third output signal 37 is provided to the HMI module 32 for the purpose of driver tutoring, as described further below.

Referring to FIG. 2, the HMI module 32 provides an interface between the selector module 20 and the driver of the vehicle and includes a selector switch 32a, a messaging module 32b and a High Level Display Function (HLDF) module 32c. In the example shown in FIG. 2, the selector switch 32a includes a dedicated hardware switch 32aa and switchgear comprising or arranged to support an existing vehicle system 32ab. The messaging module 32b comprises: display communication means 32ba, arranged to manage and generate messages to an instrument pack display and communicate with other related vehicle sub-systems; and a driver advice generator 32bb, arranged to provide appropriate messages to the driver via the instrument pack display. The HLDF module 32c comprises modules for driver information feedback 32ca and for supporting existing vehicle based HLDF systems and functionality 32cb.

The HMI module 32 is arranged to allow the driver of the vehicle to override the automatic mode and select the manual mode of operation, if preferred, via the selector switch 32a. The HMI module 32 also provides advice to the driver regarding various vehicle configurations, including the transfer box setting (HI or LO range), the air suspension off-road ride height (Raised/High, Normal, or Low) and a notification of when it is desirable to select the automatic mode of operation. The HLDF module 32c includes a plurality of graphical indicators (not shown) to indicate to the driver when there has been a change in the selected subsystem control mode when the system is operating in the automatic response mode (i.e. derived from the second output signal 36). Typically, for example, the HLDF module 32c may display a textual indication to the driver along the lines of "CONTROL MODE UPDATING".

On start-up of the vehicle, the control system is in the automatic mode and selector module 20 continually performs the probability analysis described above to deduce which of the various control modes is most appropriate. The selector module 20 automatically adjusts the control mode so that the mode which is most appropriate is used to control the vehicle subsystems. At any time the driver can deliberately override the automatic mode by switching the system into the manual mode via the selector switch 32a of the HMI module 32.

A further feature of the invention is that it includes the driver tutoring module, or driver advice module 34, which serves to provide instruction to the driver regarding various vehicle configurations or settings. The driver advice module 34 provides an interface between the selector module 20 and the HMI module 32 and provides instruction or advice messages to the driver relating to the air suspension setting (vehicle ride height) and the transfer box setting (HIGH/LOW gear ratio). The driver advice module 34 receives inputs from the air suspension system (not shown) and from the transfer box (also not shown) to indicate current status, and also receives the roughness output signal 26 from the road roughness module 24. Other driving-condition indicators (not shown in the figures) may also be provided to the module 34, for example the distance traveled at a particular road roughness, vehicle speed, surface friction (using SCS slip event detection), vehicle gradient, engine torque and ambient temperature. These indicators influence vehicle performance within the external environment of the vehicle, and as such will be referred to as "external driving condition indicators".

A trailer-attached status signal (ON/OFF) may also be provided to the module 34.

In addition, the module receives the output signal 31 from the selector module 20 to indicate which is the most appropriate one of the control system modes, based on the various terrain indicators. The driver advice module 34 includes a means for storing pre-stored look-up tables or data maps and for determining the most appropriate vehicle settings (referred to as the preferred settings), from a plurality of suitable vehicle settings, depending on the various external driving condition indicators it receives and, optionally, the trailer-attached status signal. The appropriate vehicle settings are then provided via three outputs 50, 52, 54 to the subsystem control module 14 and, from there, to the HMI module 32.

The outputs from the driver advice module 34 to the subsystem control module 14 include a transfer box setting signal 54, an air suspension setting signal 52 and an automatic mode advice signal 50. In the sub-system control module 14 a validation check or fault detection process 14a is carried out. The validation and fault detection process 14a operates so as to ensure that if one of the subsystems cannot support a selected control mode, for example because of a fault, appropriate action is taken (e.g. in the form of a warning). If validation is completed successfully, an indication is provided to the HMI module 32, via output 36, of the appropriate transfer box setting (high/low gear ratio) and the appropriate air suspension setting (Raised, Normal, or Low ride height) based on the control mode that is determined to be the most appropriate for current conditions and on the various indicators that the module 34 receives. The driver can then act, via the selector switchgear 32a, on the indication provided by the HMI module 32 to adjust the ride height (High, Normal, or Low) and/or the transfer box (HIGH/LOW) in accordance with the advice. It is a particular benefit of this feature of the invention that the driver is provided with prompt advice on optimal vehicle settings which are determined on the basis of indicators of the current terrain conditions.

The automatic mode advice signal 50 is also sent to the subsystem control module 14 so that, if the system is operating in manual mode and it is determined that one or more of the vehicle configurations for the ride height and the transfer box setting is inappropriate (as discussed further below), an indication is provided to the driver via the HMI module 32 that it would be advisable to select the automatic mode of operation. On receiving this indication, the driver can then, via the selector switchgear 32a, select the automatic mode of operation.

There now follows a series of examples of how the driver advice module 34 may operate.

Example 1

The driver advice module 34 advises the driver to select the transfer box low range setting if the vehicle is continually driven on a rough road. This advice is referred to as "transfer box low range for vehicle control". The advice is based on a function of the road roughness index (as indicated by signal 26) and the distance traveled with that road roughness index. The advice is inhibited if low range is already selected, low surface friction is detected, the vehicle is above a predetermined threshold speed above which the low range setting is not appropriate, the ambient temperature is below a threshold where low surface friction may occur or a fault is set for any critical input to this component of the system. The rationale for this operation is that on very rough tracks, or when overcoming large obstacles and terrain features, it is easier to control vehicle speed when in low range to enable a steady, low speed to be maintained without constant use of the brake pedal.

Example 2

The driver advice module 34 advises the driver to select the transfer box low range setting if the vehicle is driven on an intermittently rough road. This advice is based on a function of road roughness and distance traveled with the road roughness index. The advice is inhibited if low range is already selected, the vehicle is above a predetermined threshold speed above which low range is not appropriate, low surface friction is detected, the ambient temperature is below a threshold where low surface friction may occur or a fault is set for any critical input to this component of the system. The term "intermittent" in this context means that the road roughness is not sustained for long enough to activate the "transfer box low range for vehicle control" advice, as referred to previously in Example 1. The rationale for this operation is that on intermittently rough tracks it is easier to control vehicle speed over the rougher sections when in low range to enable a steady speed to be maintained, without constant use of the brake pedal. These conditions are typical of rough farm tracks, for example.

Example 3

The driver advice module may operate to advise a transfer box low range setting to increase the torque available at the wheels and so to protect against transmission abuse. This advise is based on a function of engine torque and torque converter slip, signals for which are both supplied to the module 34. The advice is inhibited if low range is already selected, the vehicle is above a predetermined threshold speed above which the low range setting is inappropriate, low surface friction is detected, the ambient temperature is below a threshold where low surface friction may occur or a fault is set for any critical input to this component of the system. The rationale for this operation is that when a vehicle is, for example, towing another vehicle out of a ditch, ascending a steep slope, pulling a fallen tree out of the way, pulling a high load for an extended period or a long steep ascent, more torque can be provided by selecting a low range setting. Continuous periods of high engine torque and torque converter slip cause oil temperatures to rise and potential transmission abuse may occur, and selecting low range can protect the transmission against this.

Example 4

The driver advice module 34 may operate to advise a transfer box low range setting when the vehicle is on steep gradients. For example, the driver advice module 34 advises the driver to select the transfer box low range to pull away on gradients that are too steep to begin the ascent in high range. The advice is based on a function of the gradient when the vehicle is at a standstill and uses alternate thresholds if a trailer is hitched and detected by the vehicle (trailer status ON). The advice is inhibited if low range is already selected, the vehicle is not at a standstill, low surface friction is detected, the ambient temperature is below a threshold where low surface friction may occur or a fault is set for any critical input to this component of the system. The rationale for this operation is that when insufficient torque is available at the wheels to pull away on a gradient in high range, selecting low range before pulling away again will give greater control.

Example 5

The drive advice module 34 may operate to advise the driver to select the air suspension off-road ride height if the vehicle is driven on a continually rough road. The advice is based on a function of road roughness index and distance traveled with that road roughness index. The advice is inhibited if the air suspension is already at off-road ride height, the suspension is at intermediate ride height, the vehicle is being driven at speeds outside the speed range for off-road ride height selection (e.g. above a predetermined threshold speed above which off-road ride height is inappropriate), the vehicle has a trailer attached (trailer status ON) or a fault is set for any critical input to the system. The rationale for this operation is that for very rough tracks or when overcoming large obstacles and terrain features, increasing ground clearance will protect against damage to the underside of the vehicle or grounding of the vehicle. This mode of operation is therefore referred to as "off-road ride height for underside protection" advice.

Example 6

The driver advice module may operate to advise the driver to select the air suspension off-road ride height if the vehicle is driven on an intermittently rough road. The vehicle is therefore provided with hardware to receive an input from the driver of the appropriate air suspension setting, in response to the advice that the driver receives. The advice is based on a function of road roughness index and distance traveled with that road roughness. The advice is inhibited if the air suspension is already at off-road ride height, the suspension is at intermediate ride height, the vehicle is being driven at speeds outside the speed range for off-road ride height selection (e.g. above a predetermined threshold speed above which off-road ride-height is inappropriate), the vehicle has a trailer detected (trailer status ON) or a fault is set for any critical input to the system. The term "intermittent" in this context means that the road roughness is not sustained for long enough to activate "off-road ride height for underside protection" advice, as referred to above in Example 5. The rationale for this operation is that on intermittently rough tracks increasing ground clearance will protect against damage to the underside or grounding of the vehicle.

Example 7

The driver advice module 34 may operate to advise the driver to select transfer box high range for the prevailing driving conditions. The vehicle is therefore provided with hardware to receive an input from the driver of the appropriate transfer box range, in response to the advice that the driver receives. The advice is based on a function of vehicle speed and time and that vehicle speed. The advice is inhibited if the high range is already selected or a fault is set for any critical input to the system. The rationale for this operation is that if transfer box low range is selected and the vehicle is driven at speeds approaching the limit for low range for an extended period, transmission abuse could occur. Also, there may be cases where the driver has inadvertently selected low range, advice to select high range in this case reduces the likelihood of driver irritation.

Example 8

The driver advice module 34 may operate to advise the driver to select the automatic control mode if the vehicle is being driven on-road for an extended period of time in manually-selected MR mode, GGS mode, Sand mode or RB mode. The advice is inhibited if Dynamic Stability Control is off (DSC OFF), the vehicle has a trailer detected (trailer status ON) or a fault is set for any critical input to the system. The rationale behind this is operation is that if an inappropriate control mode has been selected by the driver, the vehicle performance is not optimised for on-road performance. Advice to select the automatic control mode reduces the likelihood of driver annoyance as the most appropriate control mode for the conditions will then be selected for the driver automatically.

Example 9

In another embodiment of the invention the driver advice module may advise the driver to select from a plurality of different driving style modes, such as standard mode, economy mode (often referred to as Eco mode) and sport mode, using a driving style mode selector system. For example, if the driver has selected sport mode but it is determined from the driving condition indicators that the vehicle has moved from a high speed, sporty environment (e.g. motorway) to a low speed, economy style driving environment (e.g. urban), the driver advice module will advise the driver that Eco mode should be selected by the driving style mode selector system as the most appropriate driving style mode.

For each driving style mode that can be selected various ones of the vehicle subsystems will have preferred settings, or a range settings, which are suitable for that particular driving style. For example, in selecting Eco mode or sport mode (or any other driving style mode), the vehicle subsystems which may be adjusted to a preferred setting (or range of settings) include the gearbox, the part of the engine control system which includes throttle maps that determine fuel delivery, and the part of the engine control system which includes calibration maps.

Example 10

In another embodiment of the invention, if the vehicle is provided with a gearbox that has high number of gear ratios (e.g. gears 1 to 10), the driver advice module advises the driver to select from a selected group of the gear ratios only (e.g. the low gear ratios 1 to 4) in response to the driving condition indicators.

Example 11

Other vehicle subsystems about which the driver may be advised of the preferred setting include the vehicle braking system, the vehicle steering system or the vehicle accelerator. For example, on the basis of the driving condition indicators, for example on a steep hill, a signal may be provided to the driver regarding the preferred setting of the vehicle handbrake of the braking system i.e. that the handbrake should be applied. Other settings provided to the driver may be indicators that the angle of steer is too great for the terrain conditions, that acceleration is too great for the terrain conditions, or that braking is too hard for the terrain conditions. For example, the driver may be provided with an indication that the angle of steer is too great for terrain conditions if it is determined that this is the case, and if the angle of steer is determined to be appropriate for the terrain conditions then no indicator is provided to the driver or an indicator is provided that the angle of steer is appropriate (e.g. by the visual display of a light, or not).

Example 12

In another embodiment, driving condition indicators may be provided to the selector module 20 which are derived from another control system of the vehicle, for example to indicate the status of the control system (e.g. ON or OFF). The status of the control system may have been selected automatically by a vehicle system or may be a user-defined status. In response to the status signal, a preferred setting (e.g. ON or OFF) is determined and the output is provided to the driver advice module 34 to provide an advisory instruction to the driver regarding the preferred setting. By way of example, a driving condition indicator may be provided to the selector module regarding the status of the cruise control system of the vehicle, and in response to which it may be determined that a particular subsystem control mode is appropriate. The preferred setting for the subsystem control mode is then advised to the driver.

Other Examples

The HMI module 32 may also be provided with a further selector switch (not shown) which may be operable by the driver to implement the advisory vehicle settings displayed or otherwise conveyed via the driver advice module 34. For example, the further selector switch may be a manually operable push-button switch which, when depressed by the driver, initiates control signals to the vehicle subsystems which implement the advisory vehicle settings.

It will be appreciated that the indications provided to the driver by the driver advice module may be provided by means other than visual, for example by audio instruction if appropriate audio hardware is incorporated into the vehicle. A head up display may also interface with the driver advice module 34 to convey the driver advice.

The vehicle control system may, in other embodiments, take signals from one or more camera or other detection systems provided on the vehicle to determine which of the subsystem control modes is most appropriate. Use of camera or other detection systems in this way provides a means of anticipating in advance a change in terrain or obstructions in the vehicle pathway, for example, and enables the driver to be warned in advance about the most appropriate subsystem control mode to be selected to traverse such conditions. It will be appreciated that the driver need not be advised only on the local terrain in the immediate vicinity of the vehicle (for example, immediately beneath the vehicle wheels), but may be advised on the most appropriate control mode to navigate over the terrain in the surrounding vicinity in the forthcoming vehicle pathway.

It is a particular benefit of the invention that inputs from the brake and accelerator pedal sensors are provided to the estimator module 18 and are used as terrain indicators in the probability calculations to determine the most appropriate control mode. An indication from the pedal sensors that there is simultaneous use of the brake and the throttle pedal provides an indication of the nature of the terrain over which the vehicle is travelling.

It is a further benefit of the invention that the signals output from the ePAS to indicate the steering force applied to the wheels (steering force applied by the driver combined with steering force applied by the ePAS system) are used to determine the most appropriate control mode by inputting the steering force signal to the estimator module 18.

A still further novel aspect of the invention is that the status of the windscreen or headlamp wipers and the duration for which they are operational is used as a terrain indicator for input to the estimator module 18 and/or the selector module 20.

The wiper signal, the steering wheel force applied signal, and the pedal position signals are all input to the VCU 10 so as to contribute to the determination of the most appropriate control mode based on the combined probability calculation within the selector module 20.

It will be understood that the embodiments described above are given by way of example only and are not intended to limit the invention, the scope of which is defined in the appended claims. It will also be understood that the embodiments described may be used individually or in combination.

The invention claimed is:

1. A system for a vehicle having at least one vehicle subsystem, the system comprising:
   one or more of a vehicle detection system and a vehicle sensor system for generating a signal from which at least one terrain condition indicator is derived;
   a selector for receiving the at least one terrain condition indicator for the vehicle and for selecting, from a plurality of settings, a preferred setting for the at least one vehicle subsystem, including an air suspension system, in response to the at least one terrain condition indicator; and
   an indication device for providing to a driver an indication of the preferred setting for at least said air suspension system, wherein
   the selector is configured to receive a trailer-attached status signal and to inhibit indication of preferred settings of said air suspension system when said trailer-attached status signal indicates that a trailer is attached to the vehicle.

2. The system as claimed in claim 1, further comprising an input device for receiving a driver input indicative of the preferred setting.

3. The system as claimed in claim 2, further comprising a controller responsive to the driver input and being arranged to select the preferred setting for the at least one vehicle subsystem.

4. The system as claimed in claim 1, wherein at least one of the terrain condition indicators is derived from a signal indicative of a terrain in the immediate vicinity of the vehicle over which it is travelling.

5. The vehicle control system as claimed in claim 4, wherein each of the terrain conditions to which each of the plurality of settings corresponds is representative of at least one terrain type.

6. The system as claimed in claim 1, wherein at least one of the terrain condition indicators is derived from a signal indicative of a terrain in the surrounding vicinity of the vehicle over which it is about to travel.

7. The system as claimed in claim 1, wherein the at least one terrain condition indicator includes one or more of: vehicle speed, road roughness, distance traveled with road roughness, surface friction at wheels of the vehicle, vehicle gradient, engine torque of a vehicle engine and ambient temperature.

8. The system as claimed in claim 1, wherein one of the vehicle subsystems includes a transfer box and wherein settings for the transfer box from which the preferred setting is selected include high and low range settings.

9. The system as claimed in claim 8, comprising a processor configured to:
   receive a signal indicative of vehicle speed;
   compare the signal indicative of vehicle speed with a predetermined threshold vehicle speed above which the low range setting is inappropriate; and
   inhibit the indication device in circumstances in which the preferred setting is determined to be the low range setting and the vehicle speed exceeds the predetermined threshold vehicle speed.

10. The system as claimed in claim 1, wherein settings for the air suspension system from which the preferred setting is selected include off-road, intermediate and on-road ride height settings.

11. The system as claimed in claim 10, comprising a processor configured to:
receive a signal indicative of vehicle speed;
compare the signal indicative of vehicle speed with a predetermined threshold vehicle speed above which the off-road ride height setting is inappropriate; and
inhibit the indication device in circumstances in which the preferred setting is determined to be the off-road ride-height setting and the vehicle speed exceeds the predetermined threshold vehicle speed.

12. The system as claimed in claim 1, wherein the indication device includes one or a combination of a visual display device, an audio device and a kinaesthetic device.

13. A vehicle comprising a vehicle control system as claimed in claim 1.

14. The system as claimed in claim 1, wherein the indication of the preferred setting for said air suspension system is an indication to the driver to select an air suspension off-road ride height when the vehicle is driven on a rough road.

15. A vehicle control system for at least one vehicle subsystem of a vehicle, the vehicle control system comprising:
one or more of a vehicle detection system and a vehicle sensor system for generating a signal from which at least one driving condition indicator is derived;
a selector for receiving the at least one driving condition indicator for the vehicle and for selecting, from a plurality of settings, a preferred setting for the at least one vehicle subsystem in response to the at least one driving condition indicator;
an indication device for providing a driver an indication of the preferred setting for at least one of the vehicle subsystems;
a subsystem controller for controlling at least one vehicle subsystem in a plurality of subsystem control modes, each of which corresponds to one or more different driving conditions for the vehicle; and
a processor configured to evaluate at least one of the driving condition indicators to determine the extent to which each of the subsystem control modes is appropriate and for providing an output indicative of the subsystem control mode which is most appropriate.

16. The vehicle control system as claimed in claim 15, wherein the processor is configured to determine a probability that each of the subsystem control modes is appropriate and wherein the output provided by the processor is indicative of the subsystem control mode with the highest probability.

17. The vehicle control system as claimed in claim 15, further comprising:
a controller operable in an automatic response mode to select a subsystem control mode in dependence on the output.

18. The vehicle control system as claimed in claim 17, wherein the controller is configured to select a subsystem control mode in response to the output indicative of the subsystem control mode with the highest probability of being appropriate.

19. The vehicle control system as claimed in claim 17, including a switching device for enabling switching between the automatic response mode in which the controller controls the vehicle subsystems in dependence on the output automatically, and a manual response mode in which the appropriate subsystem control mode is selected by the driver manually.

20. The vehicle control system as claimed in claim 19, wherein the system is operable to provide an indication to the driver to switch to the automatic response mode if a subsystem control mode has been selected by the driver in the manual response mode which is not consistent with the subsystem control mode selected in dependence on the output.

21. The vehicle control system as claimed in claim 15, wherein the at least one vehicle subsystem includes one or more of: an engine management system, a steering controller, a brakes controller, a transmission controller and a suspension controller.

22. A method for advising a driver of a vehicle comprising one or more vehicle subsystems including an air suspension system, the method comprising:
generating a signal from which at least one terrain condition indicator for the vehicle is derived;
receiving the at least one terrain condition indicator for the vehicle;
selecting, from a plurality of settings, a preferred setting for the one or more vehicle subsystems in response to the at least one terrain condition indicator;
providing to the driver an indication of the preferred setting for at least said air suspension system;
receiving a trailer-attached status signal; and
inhibiting indication of preferred settings of said air suspension system when said trailer-attached status signal indicates that a trailer is attached to the vehicle.

23. The method as claimed in claim 22, wherein the at least one terrain condition indicator is derived from a signal indicative of the terrain in a surrounding vicinity of the vehicle over which it is about to travel.

24. The method as claimed in claim 22, wherein the at least one terrain condition indicator is derived from a signal indicative of a terrain in the immediate vicinity of the vehicle over which it is travelling.

25. The method as claimed in claim 22, wherein the indication of the preferred setting for said air suspension system is an indication to the driver to select an air suspension off-road height when the vehicle is driven on a rough road.

* * * * *